(12) United States Patent
Sugimoto

(10) Patent No.: US 11,427,181 B2
(45) Date of Patent: Aug. 30, 2022

(54) CONTROLLER FOR INTERNAL COMBUSTION ENGINE, CONTROL METHOD FOR INTERNAL COMBUSTION ENGINE, AND MEMORY MEDIUM

(71) Applicant: TOYOTA JIDOSHA KABUSHIKI KAISHA, Aichi-ken (JP)

(72) Inventor: Hitoki Sugimoto, Toyota (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 17/400,115

(22) Filed: Aug. 12, 2021

(65) Prior Publication Data
US 2022/0080947 A1    Mar. 17, 2022

(30) Foreign Application Priority Data
Sep. 17, 2020    (JP) .............................. JP2020-156261

(51) Int. Cl.
| | |
|---|---|
| *B60W 20/15* | (2016.01) |
| *B60W 10/06* | (2006.01) |
| *B60W 10/08* | (2006.01) |
| *F02D 41/00* | (2006.01) |

(52) U.S. Cl.
CPC ............ *B60W 20/15* (2016.01); *B60W 10/06* (2013.01); *B60W 10/08* (2013.01); *F02D 41/0087* (2013.01); *B60W 2510/06* (2013.01); *B60W 2510/083* (2013.01); *B60W 2720/30* (2013.01)

(58) Field of Classification Search
CPC ...... B60W 20/15; B60W 10/06; B60W 10/08; B60W 2510/06; B60W 2510/083; B60W 2720/30; F02D 41/0087
See application file for complete search history.

(56) References Cited

FOREIGN PATENT DOCUMENTS

| | | | | |
|---|---|---|---|---|
| CN | 101526036 B | * | 3/2012 | ............. F02D 17/02 |
| CN | 111619546 A | * | 9/2020 | ............ B60W 20/00 |
| EP | 1426590 A1 | * | 6/2004 | ............... B60K 6/48 |
| JP | 2009248698 A | | 10/2009 | |
| JP | 2010137652 A | | 6/2010 | |
| JP | 201694124 A | | 5/2016 | |

* cited by examiner

*Primary Examiner* — Tisha D Lewis
(74) *Attorney, Agent, or Firm* — Hauptman Ham, LLP

(57) ABSTRACT

A controller for an internal combustion engine, a control method for an internal combustion engine, and a memory medium are provided. The controller executes a deactivation process that deactivates combustion control in a specified one of cylinders. A compensation process operates a power generation device that produces driving torque applied to a driven wheel so as to compensate for insufficiency of the driving torque of a vehicle caused by the deactivation process. A prohibition process prohibits the deactivation process when it is determined that compensation by a predetermined amount or larger by the compensation process cannot be performed.

9 Claims, 6 Drawing Sheets

CONTROLLER FOR INTERNAL COMBUSTION ENGINE, CONTROL METHOD FOR INTERNAL COMBUSTION ENGINE, AND MEMORY MEDIUM

RELATED APPLICATIONS

The present application claims priority of Japanese Application Number 2020-156261, filed on Sep. 17, 2020, the disclosure of which is hereby incorporated by reference herein in its entirety.

BACKGROUND

1. Field

The present disclosure relates to a controller for an internal combustion engine, a control method for an internal combustion engine, and a memory medium.

2. Description of Related Art

Japanese Laid-Open Patent Publication No. 2009-248698 discloses an example of a controller that executes a fuel cut-off process for a hybrid vehicle including an internal combustion engine and an electric motor. The fuel cut-off process deactivates the supply of fuel to each cylinder of the internal combustion engine when a request output for the internal combustion engine becomes less than a threshold value.

To execute the fuel cut-off process, the controller executes a control in which the electric motor produces a compensation torque used to prevent torque shock, the torque shock resulting from the fuel cut-off process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1: The present disclosure provides a controller for an internal combustion engine. The controller is employed in a vehicle including a power generation device that generates driving torque applied to a driven wheel. The power generation device includes the internal combustion engine having cylinders. The controller is configured to execute: a deactivation process that deactivates combustion control in a specified one of the cylinders; a compensation process that operates the power generation device so as to compensate for insufficiency of the driving torque of the vehicle, the insufficiency being caused by the deactivation process; and a prohibition process that prohibits the deactivation process when it is determined that compensation by a predetermined amount or larger by the compensation process cannot be performed.

In the above-described configuration, the deactivation process deactivates the combustion control in the specified cylinder of the internal combustion engine. The compensation process is executed to operate the power generation device so as to compensate for the insufficiency of the driving torque of the vehicle caused by the deactivation process. However, when it is determined that the compensation by the predetermined amount or larger by the compensation process cannot be performed, the deactivation process is prohibited. This prevents situations in which the torque becomes considerably insufficient due to the deactivation process.

In one case, the fuel cut-off process is executed when the output requested for the internal combustion engine is large. In this case, the torque necessary for compensating for an inconvenience resulting from the fuel cut-off process may not be able to be produced. Such a problem is overcome by the above-described configuration.

Aspect 2: In the controller according to Aspect 1, the power generation device includes an electric motor. The vehicle includes a supply device that supplies power to the electric motor. The compensation process includes a production process that produces a compensation torque such that the electric motor compensates for insufficiency of torque in a predetermined period after a compression top dead center of the specified one of the cylinders. The prohibition process includes a process that prohibits execution of the deactivation process when an output of the supply device is insufficient relative to power necessary for the production process by a predetermined amount or larger.

When the deactivation process is performed, the deactivation of combustion control results in the sufficiency of the driving torque during a short period, such as the appearance interval of the compression top dead center. To solve this problem, the above-described configuration uses the electric motor to apply the compensation torque that compensates for the insufficiency of torque. The applied compensation torque compensates for the insufficiency of torque in the predetermined period after the compression top dead center of the specified cylinder. This prevents the insufficiency of the driving torque in the short period.

The upper limit value of the torque of the electric motor is dependent on the output of the supply device. Thus, the electric motor may not be able to sufficiently produce the compensation torque depending on the output of the supply device. To solve this problem, the above-described configuration prohibits the execution of the deactivation process when the output of the supply device is insufficient relative to the power necessary for the production process by the predetermined amount or larger. This prevents situations in which the driving torque becomes considerably insufficient due to the deactivation process.

Aspect 3: In the controller according to Aspect 2, the prohibition process includes a process that sets a lower limit value of an insufficient amount of the output of the supply device to be greater when a rotation speed of a crankshaft of the internal combustion engine is high than when the rotation speed is low. The insufficient amount is an amount in which the output of the supply device to prohibit the execution of the deactivation process is insufficient relative to the power necessary for the production process.

The inertial energy of the crankshaft is larger when the rotation speed of the crankshaft of the internal combustion engine is high than when the rotation speed is low. Thus, the rotation fluctuation of the crankshaft of the internal combustion engine caused by deactivating combustion control is smaller when the rotation speed of the crankshaft is high than when the rotation speed is low. Accordingly, the insufficiency of the drive force caused by deactivating the combustion control is less likely to be noticeable when the rotation speed of the crankshaft is high than when the rotation speed is low. Therefore, the above-described configuration sets the lower limit value of the insufficient amount of the output of the supply device to be greater when the rotation speed of the internal combustion engine is large than when the rotation speed is small. This allows the deactivation process to be executed more often and prevents the insufficiency of the driving torque from becoming noticeable.

Aspect 4: In the controller according to Aspect 3, the compensation torque changes cyclically, a cycle of the change in the torque being a single combustion cycle. The production process includes an amplitude setting process that variably sets a difference between a maximum value and a minimum value of the compensation torque that changes cyclically. The amplitude setting process variably sets the difference using at least one of the rotation speed of the crankshaft or load on the crankshaft.

The fluctuation of torque of the crankshaft of the internal combustion engine caused by deactivating combustion control may differ depending on the rotation speed and load on the crankshaft. Thus, a suitable compensation torque may also differ depending on the rotation speed and load. In the above-described configuration, the difference between the maximum value and minimum value of the compensation torque is variably set using at least one of the rotation speed and load on the crankshaft. Thus, as compared with when, for example, the difference between the maximum value and minimum value of the compensation torque is not variably set, the compensation torque is set to a more suitable value to restrict the fluctuation of torque of the crankshaft caused by deactivating combustion control.

Aspect 5: In the controller according to one of Aspects 2 to 4, the compensation process includes an energy increasing process, the energy increasing process increases a combustion energy amount in a cylinder that differs from the specified one of the cylinders so as to limit a decrease in an output of the internal combustion engine, the decrease being caused by the deactivation process.

In the above-described configuration, when the deactivation process is performed, the combustion energy amount in a cylinder where combustion control is not deactivated. This limits a decrease in the output per preset period of the internal combustion engine. However, even in this case, the deactivation of the combustion control results in the sufficiency of the driving torque during a period shorter than the preset period of the internal combustion engine. Thus, in the above-described configuration, the production process that produces the compensation torque is highly useful.

Aspect 6: In the controller according to Aspect 5, the internal combustion engine includes an exhaust passage and an aftertreatment device for exhaust gas arranged in the exhaust passage. The controller is configured to execute: a regeneration process for the aftertreatment device; and a determination process that determines whether an execution request of the regeneration process has been issued. The regeneration process includes a fuel increasing process and the deactivation process. The fuel increasing process increases an amount of injection performed by a fuel injection valve of the internal combustion engine such that an air-fuel ratio of air-fuel mixture in a cylinder that differs from the specified one of the cylinders becomes richer than a reference air-fuel ratio. The energy increasing process includes a charging efficiency increasing process. The charging efficiency increasing process controls a charging efficiency of the cylinder that differs from the specified one of the cylinders such that the charging efficiency becomes larger than when the deactivation process is not executed and controls the charging efficiency in correspondence with an amount of fuel increased by the fuel increasing process such that the charging efficiency becomes larger than when the deactivation process is not executed.

In the above-described configuration, the amount of fuel is increased in order to enrich the air-fuel ratio of air-fuel mixture in the cylinder that differs from the specified cylinder. Thus, even if the charging efficiency is identical, the combustion energy obtained when the amount of fuel is increased is different from, for example, the combustion energy obtained when the amount of fuel is not increased. Thus, to control the charging efficiency such that the charging efficiency increases, reference is made to the increase amount of the fuel. Thus, as compared with when, for example, no reference is made to the increase amount of the fuel, the combustion energy amount is set to a more suitable amount to compensate for insufficiency of the driving torque.

Aspect 7: In the controller according to one of Aspects 1 to 6, the compensation process includes an energy increasing process. The energy increasing process increases a combustion energy amount in a cylinder that differs from the specified one of the cylinders so as to limit a decrease in an output of the internal combustion engine, the decrease being caused by the deactivation process. The controller is further configured to execute a high torque response process. The high torque response process adjusts an operating point of the internal combustion engine such that an identical output is provided at a lower rotation speed when an increased speed of a requested torque for the power generation device is greater than or equal to a predetermined speed than when the increased speed of the requested torque is less than the predetermined speed. The prohibition process includes a process that prohibits the deactivation process when it is determined that the compensation by the predetermined amount or larger by the compensation process cannot be performed in a case in which the high torque response process is executed.

In the above-described configuration, the energy increasing process compensates for a decrease in the average output of the internal combustion engine during the preset period, the decrease being caused by the deactivation process.

Further, in the above-described configuration, the operating point of the internal combustion engine is adjusted such that the identical output is provided at the lower rotation speed when the increased speed of the requested torque is greater than or equal to the predetermined speed than when the increased speed of the requested torque is less than the predetermined speed. Thus, when the increased speed of the requested torque is greater than or equal to the predetermined speed, the increased amount of the rotation speed during an increase in the output of the internal combustion engine is reduced. During the period in which the rotation speed of the internal combustion engine increases, at least part of the increase amount of the combustion energy is used to increase the rotation speed and thus does not contribute to increasing the torque applied to the driven wheel. Accordingly, the high torque response process quickly increases the torque applied to the driven wheel.

In the above-described configuration, when the high torque response process is executed, the deactivation process is prohibited. When the high torque response process is executed, the driving torque is requested to be increased quickly. Thus, sufficient compensation may not be able to be made for the insufficiency of torque caused by the deactivation process. To solve this problem, the above-described configuration prohibits the deactivation process. This prevents situations in which the driving torque becomes insufficient due to the deactivation process.

Aspect 8: A control method for an internal combustion engine including the processes according to any one of Aspects 1 to 7 is provided.

Aspect 9. A non-transitory computer-readable memory medium that stores a control process that causes the processor to execute the processes according to any one of Aspects 1 to 7 is provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment will now be described with reference to FIGS. 1 to 6.

Figure 1:
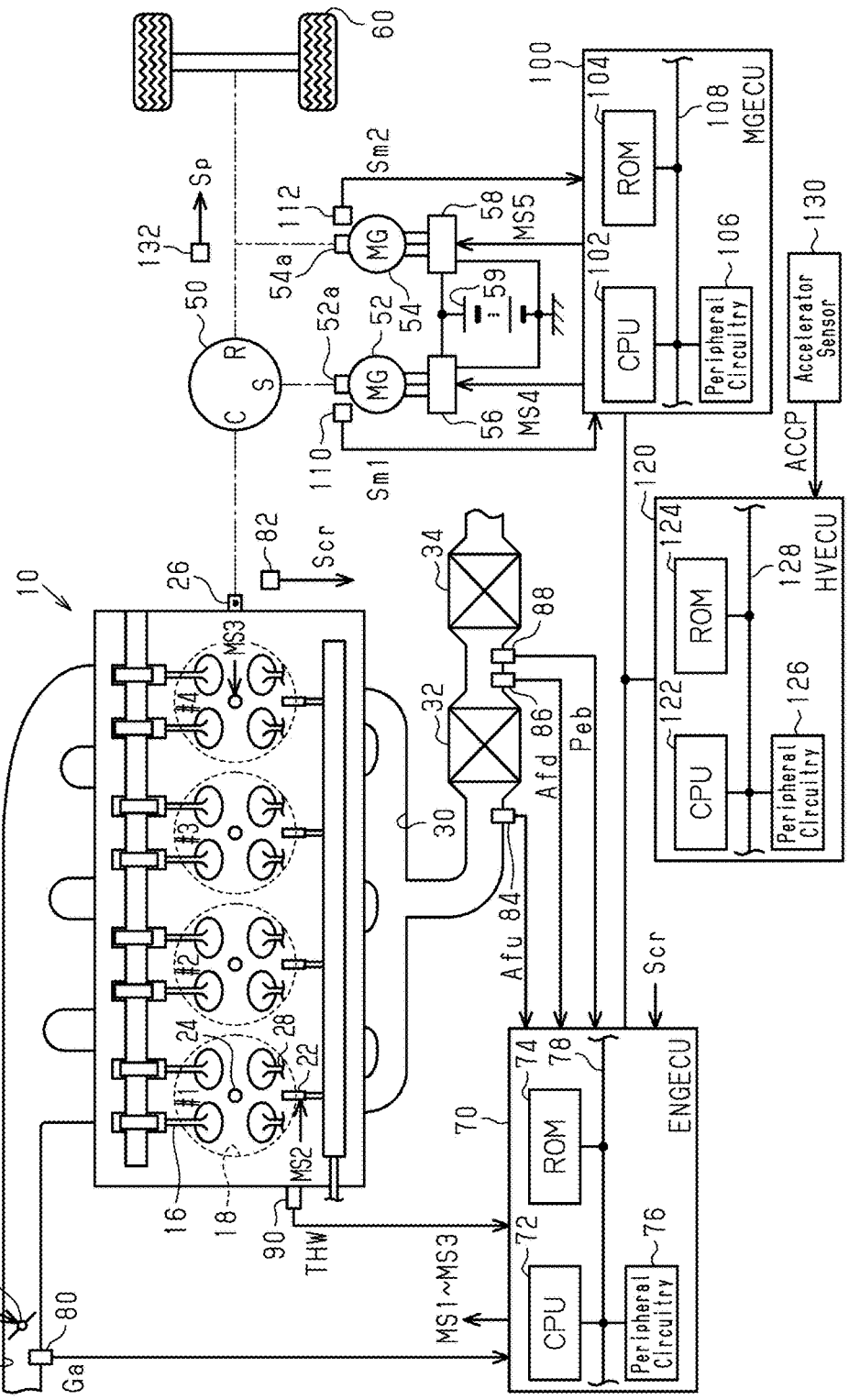
FIG. 1 is a diagram showing a drive system and its control system according to an embodiment.

As shown in FIG. 1, an internal combustion engine 10 includes four cylinders, namely, cylinders #1 to #4. The internal combustion engine 10 includes an intake passage 12 provided with a throttle valve 14. The air drawn into the intake passage 12 flows into combustion chambers 18 as intake valves 16 open. Fuel is injected into the combustion chambers 18 from direct injection valves 22. The air-fuel mixtures of air and fuel in the combustion chambers 18 are burned by spark discharge of ignition plugs 24. The generated combustion energy is converted into rotation energy of a crankshaft 26.

When exhaust valves 28 open, the air-fuel mixtures burned in the combustion chambers 18 are discharged to an exhaust passage 30 as exhaust gas. The exhaust passage 30 includes a three-way catalyst 32 having an oxygen storage capacity and a gasoline particulate filter (GPF) 34. In the present embodiment, a three-way catalyst supported by a PM-trapping filter is described as an example of the GPF 34.

The crankshaft 26 is mechanically coupled to a carrier C of a planetary gear mechanism 50, which includes a power split device. A rotary shaft 52a of a first motor generator 52 is mechanically coupled to a sun gear S of the planetary gear mechanism 50. A rotary shaft 54a of a second motor generator 54 and driven wheels 60 are mechanically coupled to a ring gear R of the planetary gear mechanism 50. An inverter 56 applies alternating-current voltage to a terminal of the first motor generator 52. An inverter 58 applies alternating-current voltage to a terminal of the second motor generator 54. The inverters 56, 58 convert the terminal voltage of a battery 59, which is a direct-current voltage source, into alternating-current voltage. In the present embodiment, it is assumed that the battery 59 is a rechargeable battery such as a lithium ion rechargeable battery.

The internal combustion engine 10 is controlled by an engine ECU (ENGECU) 70. In order to control the controlled variables of the internal combustion engine 10 (for example, torque or exhaust component ratio), the ENGECU 70 operates operation units of the internal combustion engine 10 such as the throttle valve 14, the direct injection valves 22, and the ignition plugs 24. FIG. 1 shows operation signals MS1 to MS3 that correspond to the throttle valve 14, the direct injection valves 22, and the ignition plugs 24, respectively.

To control the controlled variables, the ENGECU 70 refers to an intake air amount Ga detected by an air flow meter 80 and an output signal Scr of a crank angle sensor 82. Further, the controller 70 refers to an upstream detection value Afu detected by an upstream air-fuel ratio sensor 84, which is arranged upstream of the three-way catalyst 32, and a downstream detection value Afd detected by a downstream air-fuel ratio sensor 86, which is arranged downstream of the three-way catalyst 32. Furthermore, the ENGECU 70 refers to pressure Pex detected by an exhaust pressure sensor 88 and a water temperature THW detected by a water temperature sensor 90. The pressure Pex is the pressure of exhaust gas flowing into the GPF 34.

The ENGECU 70 includes a CPU 72, a ROM 74, and peripheral circuitry 76. These components are capable of communicating with one another via a communication line 78. The peripheral circuitry 76 includes a circuit that generates a clock signal regulating operations in the ENGECU 70, a power supply circuit, and a reset circuit. The ENGECU 70 controls the controlled variables by causing the CPU 72 to execute programs stored in the ROM 74.

Further, the ENGECU 70 is capable of communicating with a motor generator ECU (MGECU) 100 and a hybrid vehicle ECU (HEVECU) 120 that are located outside of the ENGECU 70.

The MGECU 100 controls the first motor generator 52, and operates the inverter 56 in order to control the rotation speed of the first motor generator 52, which is the controlled variable of the first motor generator 52. The MGECU 100 also controls the second motor generator 54, and operates the inverter 58 in order to control the rotation speed of the second motor generator 54, which is the controlled variable of the second motor generator 54. FIG. 1 shows operation signals MS4, MS5 for the inverters 56, 58. In order to control the controlled variables, the MGECU 100 refers to an output signal Sm1 of a first rotation angle sensor 110 that detects the rotation angle of the first motor generator 52 and an output signal Sm2 of a second rotation angle sensor 112 that detects the rotation angle of the second motor generator 54.

The MGECU 100 includes a CPU 102, a ROM 104, and peripheral circuitry 106. These components are capable of communicating with one another via a communication line 108. The MGECU 100 controls the controlled variables by causing the CPU 102 to execute programs stored in the ROM 104.

The HEVECU 120 controls a hybrid system that includes the internal combustion engine 10, the first motor generator 52, and the second motor generator 54. The HEVECU 120 outputs a command value for the internal combustion engine 10 to the ENGECU 70 and outputs command values for the first motor generator 52 and the second motor generator 54 to the MGECU 100. To output the command values, the HEVECU 120 refers to an accelerator operation amount ACCP, which is the depression amount of an accelerator pedal detected by an accelerator sensor 130, and an output signal Sp of an output-side rotation angle sensor 132 that detects the rotation angle of the ring gear R. The HEVECU 120 includes a CPU 122, a ROM 124, and peripheral circuitry 126. These components are capable of communicating with one another via a communication line 128. The HEVECU 120 calculates a command value and outputs the command value to a device outside of the HEVECU 120 by causing the CPU 122 to execute programs stored in the ROM 124.

Figure 2:
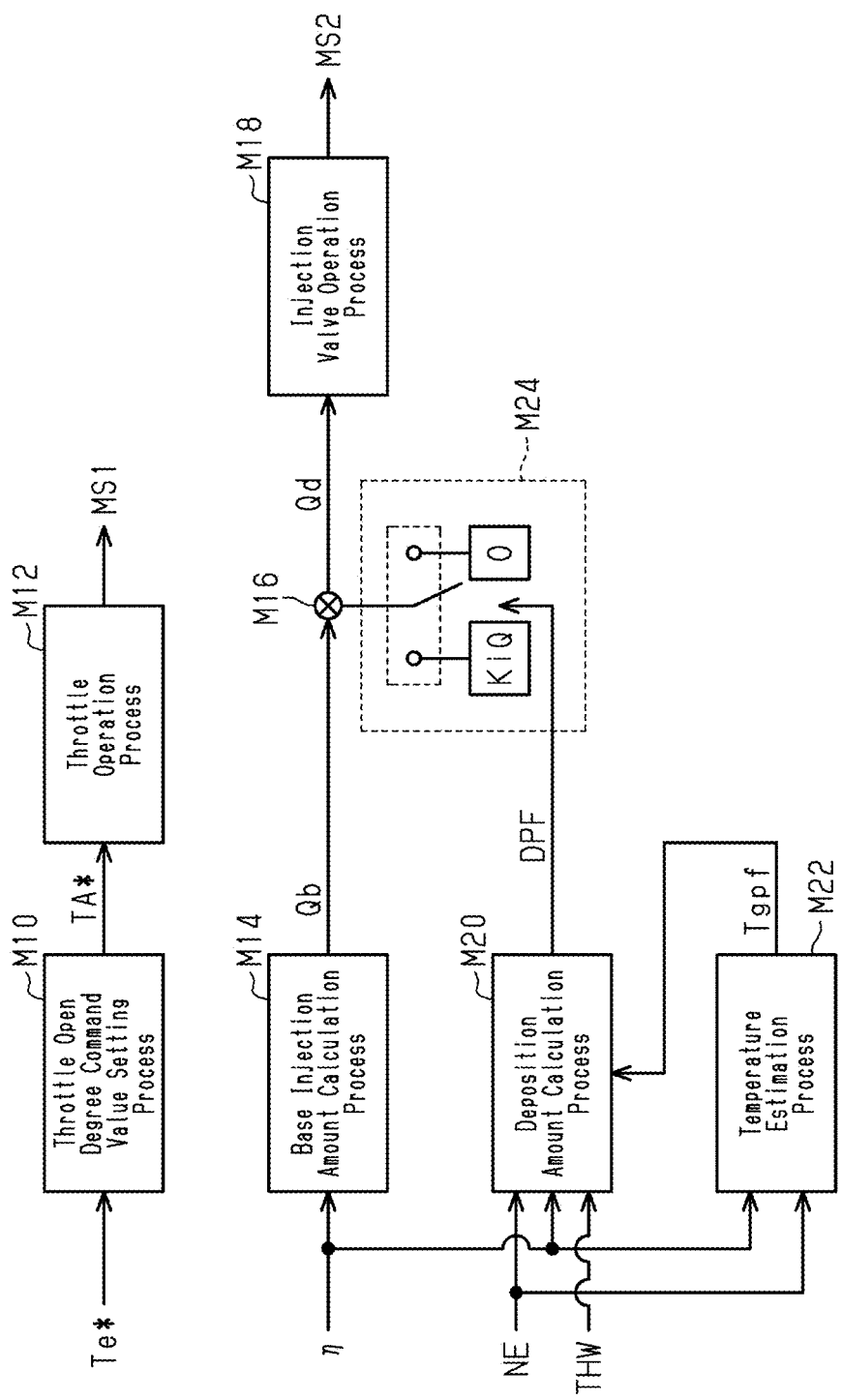
FIG. 2 is a block diagram illustrating processes executed by the ENGECU of the embodiment.

FIG. 2 shows the processes executed by the ENGECU 70. The processes shown in FIG. 2 are executed by the CPU 72 repeatedly executing programs stored in the ROM 74, for example, in a predetermined cycle.

A throttle open degree command value setting process M10 sets a throttle open degree command value TA*, which is a command value of the open degree of the throttle valve 14, by using an engine requested torque Te*, which is a command value of the torque for the internal combustion engine 10, as an input. A throttle operation process M12 outputs the operation signal MS1 to the throttle valve 14 in order to operate the open degree of the throttle valve 14 in reference to the throttle open degree command value TA*.

A base injection amount calculation process M14 calculates a base injection amount Qb in reference to a charging efficiency η. The charging efficiency η is calculated by the CPU 72 in reference to the intake air amount Ga. The base injection amount Qb simply needs to be obtained by, for example, multiplying the charging efficiency η by a proportional coefficient such that the air-fuel ratio of air-fuel mixture in the combustion chamber 18 becomes a stoichiometric air-fuel ratio.

A requested injection amount calculation process M16 uses the base injection amount Qb to calculate a requested injection amount Qd, which is a requested value of the amount of fuel injected from the direct injection valve 22.

An injection valve operation process M18 outputs the operation signal MS2 to the direct injection valve 22 in order to operate the direct injection valve 22 such that the amount of fuel injected by the direct injection valve 22 has a value corresponding to the requested injection amount Qd.

A deposition amount calculation process M20 uses a rotation speed NE, the charging efficiency η, the water temperature THW, and a temperature Tgpf of the GPF 34 to calculate a deposition amount DPM. The deposition amount DPM is the amount of PM trapped by the GPF 34. The deposition amount calculation process M20 simply needs to include, for example, a process that uses the rotation speed NE, the charging efficiency and the water temperature THW to calculate the amount of PM in exhaust gas and a process that uses the rotation speed NE, the charging efficiency η, the temperature Tgpf, and the amount of PM in exhaust gas to calculate an update amount of the deposition amount DPM.

A temperature estimation process M22 estimates the temperature Tgpf using the rotation speed NE and the charging efficiency η.

A regeneration process M24 burns and removes the PM trapped by the GPF 34. For a specified one of cylinders #1 to #4, the regeneration process M24 substitutes 0 into the coefficient multiplied by the base injection amount Qb in the requested injection amount calculation process M16 such that the requested injection amount Qd becomes 0. For the remaining cylinders that differ from the specified one of the cylinders #1 to #4, the regeneration process M24 substitutes a value KiQ into the coefficient multiplied by the base injection amount Qb in the requested injection amount calculation process M16 such that the air-fuel ratio of air-fuel mixture becomes richer than the stoichiometric air-fuel ratio. The value KiQ is greater than 1.

Figure 3:
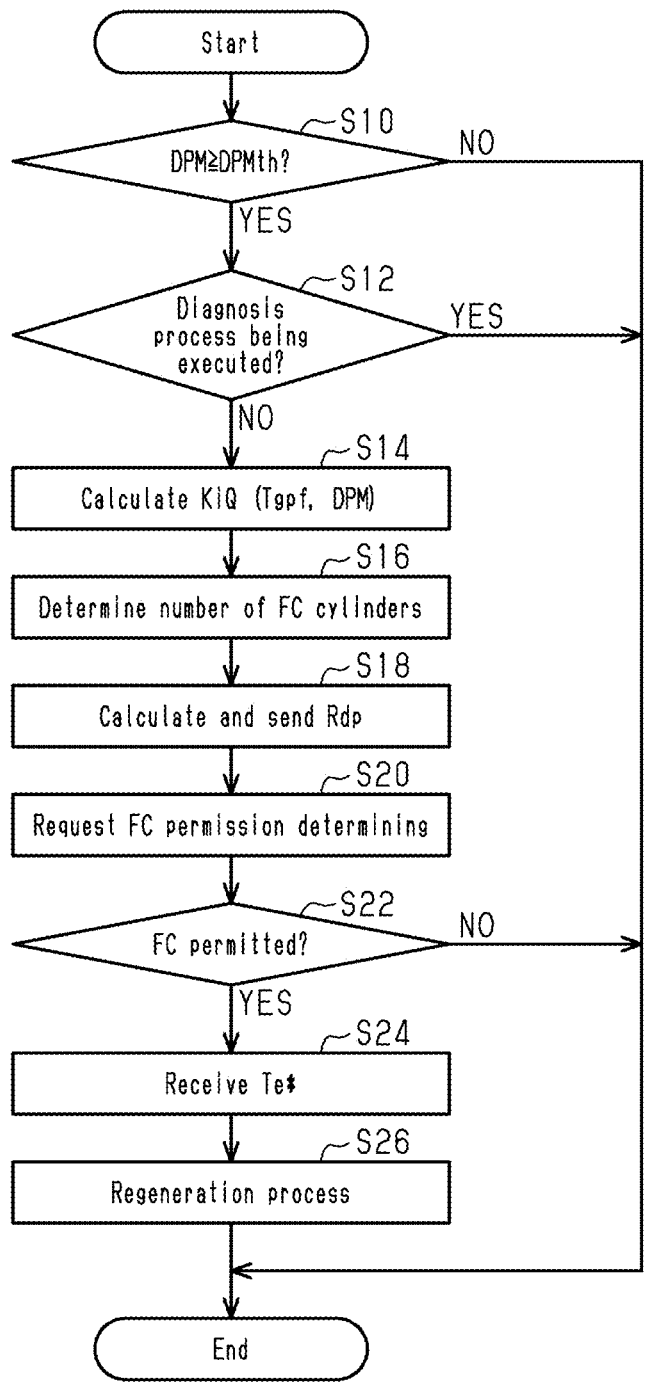
FIG. 3 is a flowchart showing a procedure of processes executed by the ENGECU of the embodiment.

FIG. 3 shows a procedure of processes executed by the ENGECU 70. The processes shown in FIG. 3 are executed by the CPU 72 repeatedly executing programs stored in the ROM 74, for example, in a predetermined cycle. In the following description, the number of each step is represented by the letter S followed by a numeral.

In a series of processes shown in FIG. 3, the CPU 72 first determines whether the deposition amount DPM is greater than or equal to a threshold value DPMth (S10). When determining that the deposition amount DPM is greater than or equal to the threshold value DPMth (S10: YES), the CPU 72 determines whether a predetermined diagnosis process for the internal combustion engine 10 is being executed (S12). The determination process of S12 determines whether one of multiple conditions for permitting the execution of the regeneration process for the GPF 34 is satisfied.

The predetermined diagnosis process includes, for example, a diagnosis process that determines whether there is a deterioration anomaly in the three-way catalyst 32. This process diagnoses whether the three-way catalyst 32 has an anomaly in which the maximum value of the oxygen absorption amount of the three-way catalyst 32 is excessively small. The maximum value of the oxygen absorption amount of the three-way catalyst 32 simply needs to be calculated, for example, using the amount of unburned fuel that has flowed into the three-way catalyst 32 until the downstream detection value Afd is reversed from a lean value to a rich value, by enriching the air-fuel ratio of air-fuel mixture from the point in time when the downstream detection value Afd becomes leaner than the stoichiometric air-fuel ratio. The unburned fuel amount simply needs to be calculated by the CPU 72 in reference to the intake air amount Ga and the upstream detection value Afu.

Further, the predetermined diagnosis process for the internal combustion engine 10 in S12 includes, for example, a diagnosis process that determines whether the responsivity of the upstream air-fuel ratio sensor 84 has deteriorated. This process is executed by cyclically repeating a state in which the air-fuel ratio of the air-fuel mixture is richer than the stoichiometric air-fuel ratio and a state in which the air-fuel ratio of the air-fuel mixture is leaner than the stoichiometric air-fuel ratio and then detecting, for example, dead time of the upstream air-fuel ratio sensor 84 in reference to the upstream detection value Afu.

Furthermore, the predetermined diagnosis process for the internal combustion engine 10 in S12 includes a diagnosis process that determines whether there is an anomaly in a fuel supply system. This process uses feedback-control to set the upstream detection value Afu to a target value and determines that there is an anomaly in the fuel supply system when the absolute value of the operation amount of the feedback control is greater than or equal to a threshold value.

Additionally, the predetermined diagnosis process for the internal combustion engine 10 in S12 includes a diagnosis process that determines whether there is an imbalance anomaly. In this process, the direct injection valve 22 is operated such that the air-fuel ratio of air-fuel mixture becomes a predetermined air-fuel ratio in all of cylinders #1 to #4. In this process, at least one of the behavior of the upstream detection value Afu during the operation of the direct injection valve 22 and the behavior of the rotation of the crankshaft 26 is used to determine whether there is a cylinder in which the air-fuel ratio of air-fuel mixture is greatly deviated from the average value.

When determining that the predetermined diagnosis process is not being executed (S12: NO), the CPU 72 calculates the value KiQ, which is used to determine the requested injection amounts Qd of cylinders #2 to #4, in correspondence with the temperature Tgpf and the deposition amount DPM (S14). In this process, the CPU 72 sets the value KiQ to be larger in order to increase the injection amount when the temperature Tgpf is low than when the temperature Tgpf is high. Further, the CPU 72 variably sets the value KiQ in correspondence with the deposition amount DPM. More specifically, the CPU 72 performs map calculation of the value KiQ with the ROM 74 storing, in advance, map data in which the temperature Tgpf and the deposition amount DPM are input variables and the value KiQ is an output variable.

The map data refers to a data set of discrete values of input variables and values of output variables that respectively correspond to the values of the input variables. For example, in the map calculation, when the value of an input variable matches one of the values of input variables on the map data, the value of the corresponding output variable of the map data is used as the calculation result. Additionally, when the value of the input variable does not match any of the values of the input variable on the map data, the map calculation simply needs to include a process that uses, as the calculation result, a value obtained by interpolation of multiple values of the output variable included in the map data.

Next, the CPU 72 uses the temperature TgpF and the deposition amount DPM to determine the number of cylinders in which combustion control is deactivated in the regeneration process for the GPF 34; that is, determine the number of cylinders in which fuel cut-off (FC) is performed (S16).

Then, the CPU 72 calculates a reduction proportion Rdp of the output of the internal combustion engine 10 obtained by executing the regeneration process for the GPF 34, and sends the reduction proportion Rdp to the HEVECU 120 (S18). In this process, the CPU 72 calculates the reduction proportion Rdp using the value KiQ and the number of cylinders in which combustion control is deactivated. Further, the CPU 72 requests the HEVECU 120 to determine whether the execution of the regeneration process for the GPF 34 is permitted (S20).

When notified from the HEVECU 120 that the execution of the regeneration process is permitted (S22: YES), the CPU 72 receives the engine requested torque Te* from the HEVECU 120 (S24). Then, the CPU 72 executes the regeneration process for the GPF 34 in accordance with the value KiQ, which has been set in S14, and the number of cylinders in which combustion control is deactivated, which has been determined in the process of S16 (S26).

When completing the process of S26, when making a negative determination in the process of S10 or S22, or when making an affirmative determination in the process of S12, the CPU 72 temporarily ends the series of processes shown in FIG. 3.

Figure 4:
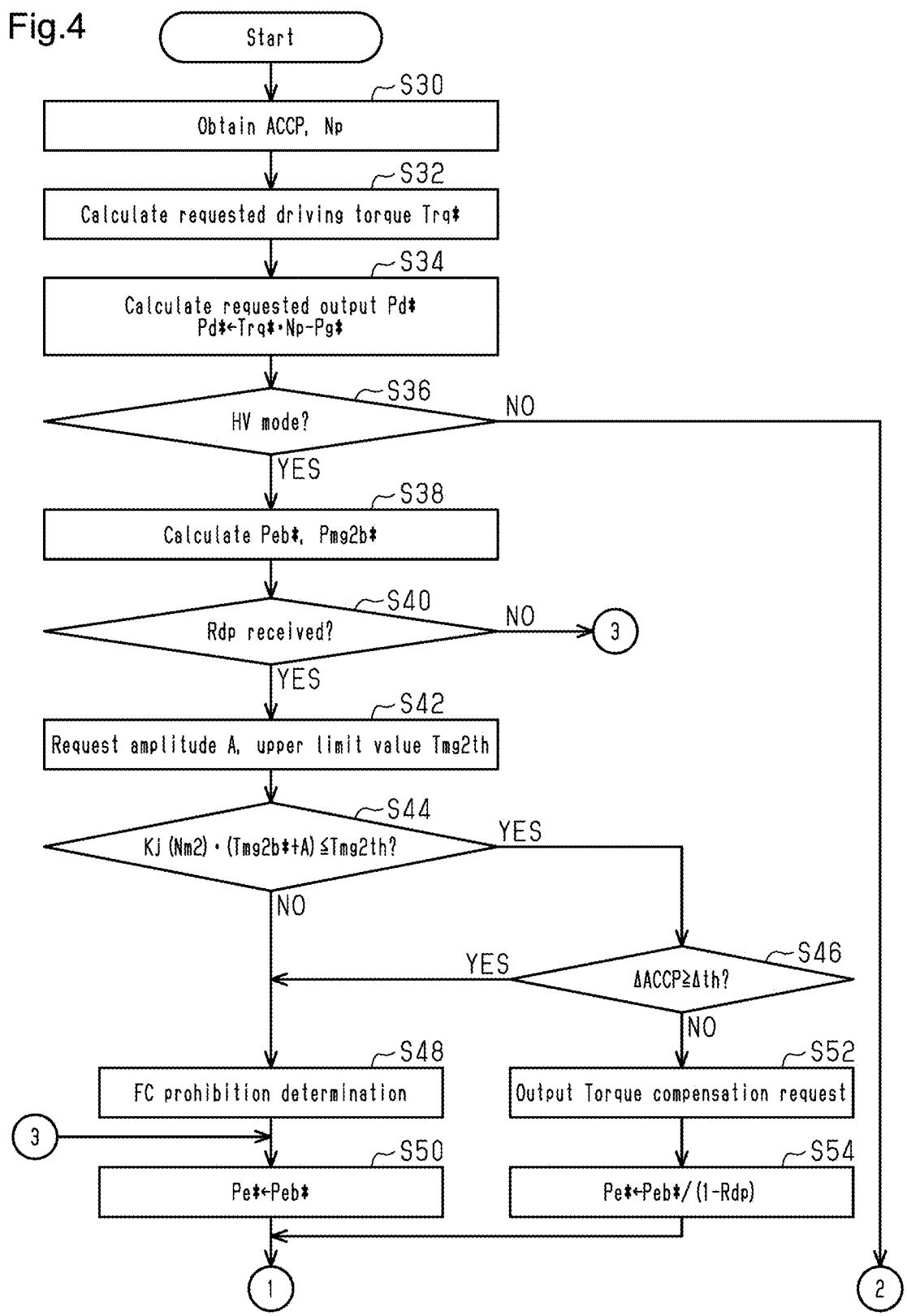
FIG. 4 is a flowchart showing a procedure of processes executed by the HEVECU of the embodiment.
Figure 5:
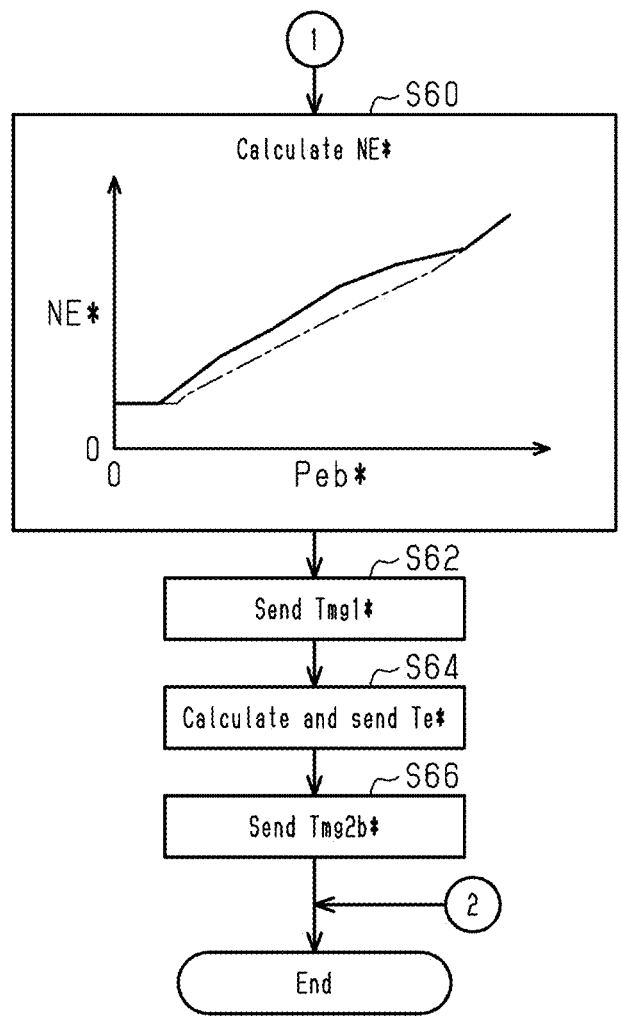
FIG. 5 is a flowchart showing a procedure of processes executed by the HEVECU of the embodiment.

FIGS. 4 and 5 show a procedure of processes executed by the HEVECU 120. The processes shown in FIGS. 4 and 5 are executed by the CPU 122 repeatedly executing programs stored in the ROM 124, for example, in a predetermined cycle.

In the series of processes shown in FIGS. 4 and 5, the CPU 122 first obtains the accelerator operation amount ACCP and an output-side rotation speed Np (S30). The output-side rotation speed Np is the rotation speed of the ring gear R. The CPU 122 calculates the output-side rotation speed Np using the output signal Sp of the output-side rotation angle sensor 132. Next, the CPU 122 uses the accelerator operation amount ACCP and the output-side rotation speed Np to calculate a requested driving torque Trq* (S32). The requested driving torque Trq* is requested for the driven wheels 60. In the present embodiment, the requested driving torque Trq* is converted into the torque of the ring gear R. Then, the CPU 122 calculates a requested output Pd* (S34). The requested output Pd* is the total sum of the output requested for the first motor generator 52 and the second motor generator 54. The CPU 122 subtracts a discharged power command value Pg* from the product of the requested driving torque Trq* and the output-side rotation speed Np and then substitutes the subtracted value into the requested output Pd*. The discharged power command value Pg* is a command value of the discharged power of the battery 59. The discharged power command value Pg* becomes negative when the battery 59 is charged and becomes positive when the battery 59 is discharged.

Subsequently, the CPU 122 determines whether an HEV mode is being executed (S36). The CPU 122 uses, for example, the requested output Pd* to determine whether the HEV mode or a battery electric vehicle (BEV) mode is being executed. In the HEV mode, the internal combustion engine 10 is running. In the BEV mode, the driven wheels 60 are driven using only the power of the second motor generator 54. When determining that the HEV mode is being executed (S36: YES), the CPU 122 calculates an engine requested output base value Peb* and a second MG requested output base value Pmg2b* (S38). The engine requested output base value Peb* is the base value of a requested output for the internal combustion engine 10. The second MG requested output base value Pmg2b* is the base value of a requested output for the second motor generator 54. The CPU 122 uses the requested output Pd* to calculate the engine requested output base value Peb* and the second MG requested output base value Pmg2b*. It is desired that the CPU 122 refer to, for example, the temperature or the state of charge of the battery 59.

Next, the CPU 122 determines whether the reduction proportion Rdp of the output of the internal combustion engine 10 obtained by executing the regeneration process for the GPF 34 has been received (S40). When determining that the reduction proportion Rdp has been received (S40: YES), the CPU 122 requests the MGECU 100 for an amplitude A and an upper limit value Tmg2th (S42). The amplitude A is the amplitude of a compensation torque ΔTmg2 generated by the second motor generator 54 during the regeneration process for the GPF 34. The upper limit value Tmg2th is an upper limit value of the torque of the second motor generator 54.

Then, the CPU 122 multiplies a coefficient Kj, which is greater than 0 and less than or equal to 1, by the sum of the amplitude A, of which the CPU 122 is notified from the MGECU 100, and a second MG requested torque base value Tmg2b*, which is the base value of the requested torque of the second motor generator 54. The CPU 122 determines whether the multiplied value is less than or equal to the upper limit value Tmg2th of the torque of the second motor generator 54 (S44). The CPU 122 calculates the second MG requested torque base value Tmg2b* by dividing the second MG requested output base value Pmg2b* by a second MG rotation speed Nm2. The second MG rotation speed Nm2 is the rotation speed of the rotary shaft 54a of the second motor generator 54. The second MG rotation speed Nm2 is calculated by the CPU 102 in reference to the output signal Sm2 of the second rotation angle sensor 112 so that the HEVECU 120 is notified of the second MG rotation speed Nm2. The process of S44 determines whether the second motor generator 54 is capable of compensating for insufficiency of the torque of the internal combustion engine 10 when the regeneration process for the GPF 34 is performed.

The CPU 122 sets the value of the coefficient Kj to be smaller when the second MG rotation speed Nm2 is high than when the second MG rotation speed Nm2 is low.

When determining that the multiplied value on the left side of S44 is less than or equal to the upper limit value Tmg2th of the torque of the second motor generator 54 (S44: YES), the CPU 122 determines whether an increase amount ΔACCP of the accelerator operation amount ACCP per unit time is greater than or equal to a predetermined amount Δth (S46). This process determines whether the speed of increasing the torque requested for the driven wheels 60 is requested to be greater than or equal to a predetermined speed.

When determining that the multiplied value on the left side of S44 is greater than the upper limit value Tmg2th of the torque of the second motor generator 54 (S44: NO) or when determining that the increase amount ΔACCP of the accelerator operation amount ACCP per unit time is greater than or equal to the predetermined amount Δth (S46: YES), the CPU 122 determines that a fuel cut-off process is prohibited in a specified cylinder of the internal combustion engine 10 (S48). When completing the process of S48 or making a negative determination in the process of S40, the CPU 122 substitutes the engine requested output base value Peb* into an engine requested output Pe* (S50).

When determining that the increase amount ΔACCP of the accelerator operation amount ACCP per unit time is less than the predetermined amount Δth (S46: NO), the CPU 122 outputs a requested torque compensation request to the MGECU 100 such that the second motor generator 54 compensates for the insufficiency of the torque caused by the regeneration process for the GPF 34 (S52). Subsequently, the CPU 122 substitutes, into the engine requested output Pe*, a value obtained by dividing the engine requested output base value Peb* by 1-Rdp (S54). This process calculates the engine requested output Pe* as a variable used to calculate the amount necessary for an actual output of the internal combustion engine 10 to become the engine requested output base value Peb* when the regeneration process for the GPF 34 is executed.

When completing the process of step S50 or S54, the CPU 122 executes the process of S60 in FIG. 5. That is, the CPU 122 calculates an engine speed command value NE*, which is a command value of the rotation speed NE of the crankshaft 26 of the internal combustion engine 10. Normally, the CPU 122 uses the engine requested output base value Peb* to calculate the engine speed command value NE* in accordance with a fuel economy line shown by the solid line in FIG. 5. The fuel economy line traces the engine speed command value NE* corresponding to an operating point at which the fuel consumption rate is minimized in order to achieve an identical output. When making an affirmative determination in the process of S46, the CPU 122 calculates the engine speed command value NE* in accordance with a power line shown by the broken line in FIG. 5. The power line (broken line) traces the engine speed command value NE* that is located at a low-speed region as compared with the fuel economy line (solid line). The setting of the power line is made to quickly increase the torque applied to the driven wheels 60. That is, when the rotation speed NE is increased in order for the output of the internal combustion engine 10 to become the engine requested output base value Peb*, the increase amount of the combustion energy of the internal combustion engine 10 during a period in which the rotation speed NE is increased is partially used to increase the rotation speed NE by accelerating the rotation of the crankshaft 26. Of the increase amount of the combustion energy of the internal combustion engine 10, the amount used to increase the rotation speed NE by accelerating the rotation of the crankshaft 26 does not contribute to increasing the torque of the driven wheels 60.

Subsequently, the CPU 122 calculates a first requested torque Tmg1* and sends the first requested torque Tmg1* to the MGECU 100 (S62). The first requested torque Tmg1* is a command value of the torque of the first motor generator 52 and is necessary to control the rotation speed NE to the engine speed command value NE*. Next, the CPU 122 divides the engine requested output Pe* by the engine speed command value NE* so as to send the engine requested torque Te* to the ENGECU 70 (S64). Further, the CPU 122 sends the second MG requested torque base value Tmg2b* to the MGECU 100 (S66).

When completing the process of S66 or when making a negative determination in the process of S36, the CPU 122 temporarily ends the series of processes shown in FIGS. 4 and 5.

Figure 6:
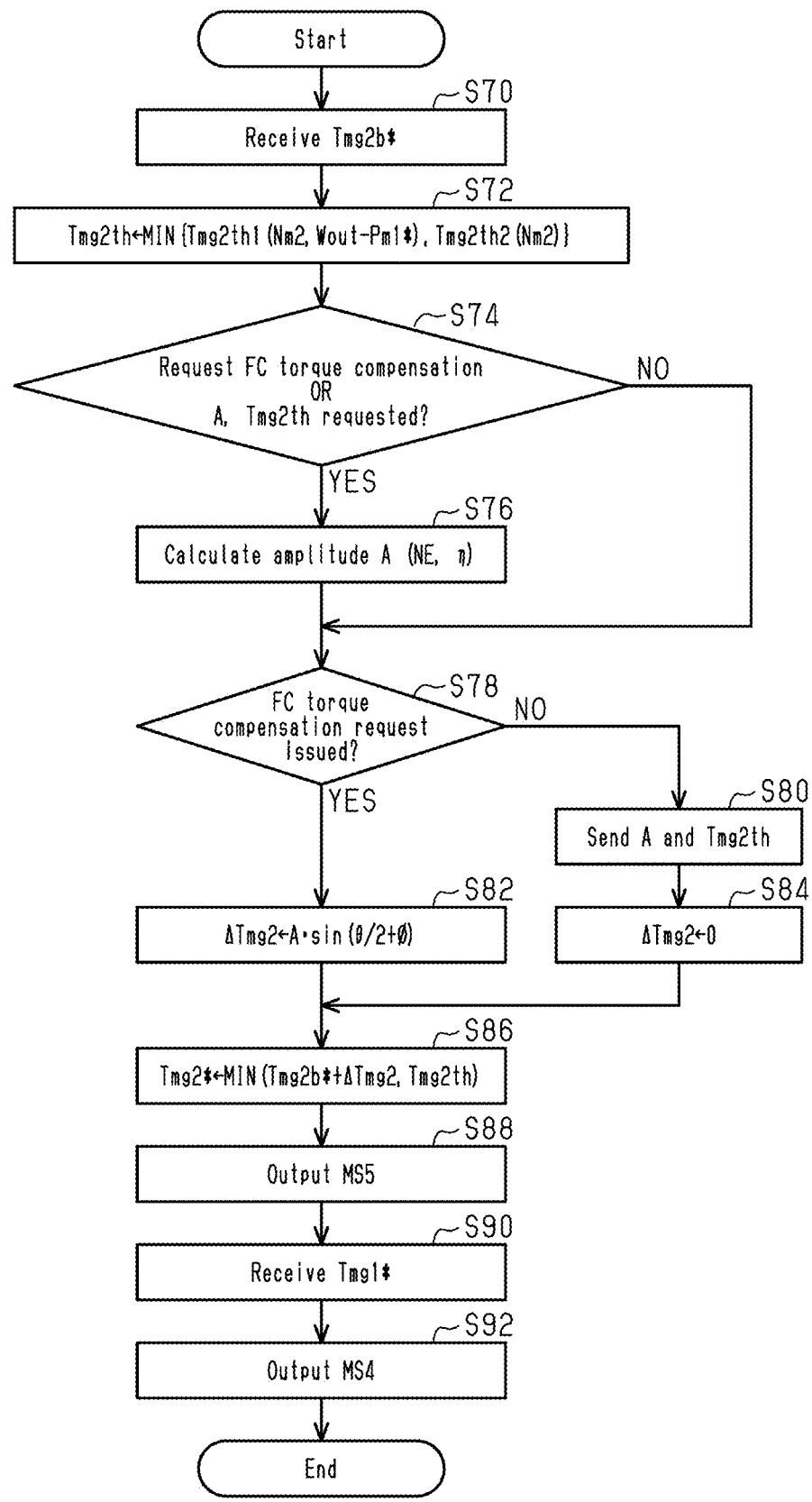
FIG. 6 is a flowchart showing a procedure of processes executed by the MGECU of the embodiment.

FIG. 6 shows a procedure of processes executed by the MGECU 100. The processes shown in FIG. 6 are executed by the CPU 102 repeatedly executing programs stored in the ROM 104, for example, in a predetermined cycle.

In the series of processes shown in FIG. 6, the CPU 102 first receives the second MG requested torque base value Tmg2b* from the HEVECU 120 (S70). Next, the CPU 102 substitutes, into the upper limit value Tmg2th of the torque of the second motor generator 54, the smaller one of a first upper limit value Tmg2th1 and a second upper limit value Tmg2th2 (S72).

The first upper limit value Tmg2th1 is the upper limit value Tmg2th of torque defined to satisfy a condition in which the torque does not exceed an upper limit value Wout of the output of the battery 59. The CPU 102 calculates the first upper limit value Tmg2th1 using the second MG rotation speed Nm2, which is the rotation speed of the second motor generator 54, the upper limit value Wout, and a generated power Pm1* of the first motor generator 52. The CPU 102 sets the first upper limit value Tmg2th1 to be smaller when the second MG rotation speed Nm2 is high than when the second MG rotation speed Nm2 is low. Further, the CPU 102 sets the first upper limit value Tmg2th1 to be larger when a value obtained by subtracting the generated power Pm1* from the upper limit value Wout is large than when the value is small. More specifically, the CPU 102 performs map calculation of the first upper limit value Tmg2th1 with the ROM 104 storing, in advance, map data in which the value obtained by subtracting the generated power Pm1* from the upper limit value Wout and the second MG rotation speed Nm2 are input variables and the first upper limit value Tmg2th1 is an output variable.

The second upper limit value Tmg2th2 is a rated torque of the second motor generator 54. The CPU 102 sets the second upper limit value Tmg2th2 to be smaller when the second MG rotation speed Nm2 is high than when the second MG rotation speed Nm2 is low. More specifically, the CPU 102 performs map calculation of the second upper limit value Tmg2th2 with the ROM 104 storing, in advance, map data in which the second MG rotation speed Nm2 is an input variable and the second upper limit value Tmg2th2 is an output variable.

Subsequently, the CPU 102 determines whether the logical disjunction is true of the torque compensation request having been output from the HEVECU 120 and a request for the amplitude A and the upper limit value Tmg2th having been issued (S74). When determining that the logical disjunction is true (S74: YES), the CPU 102 calculates the amplitude A of the compensation torque (S76). The compensation torque is generated by the second motor generator 54 in order to compensate for torque fluctuation of which the cycle is a single combustion cycle of the crankshaft 26 of the internal combustion engine 10. The torque fluctuation occurs when combustion control is deactivated in a specified one of the cylinders of the internal combustion engine 10 through the regeneration process for the GPF 34. The CPU 102 calculates the amplitude A using the rotation speed NE and the charging efficiency $\eta$. The rotation speed NE is a variable used to obtain the inertial energy of the crankshaft 26. The rotation fluctuation amount of the crankshaft 26 resulting from the difference in the combustion energy of a compression top dead center cycle becomes smaller when the inertial energy is large than when the inertial energy is small. The rotation fluctuation amount refers to a fluctuation amount at an instantaneous speed. The instantaneous speed is the rotation speed of the crankshaft 26 at an interval that is less than or equal to an appearance interval between compression top dead centers. The charging efficiency $\eta$ is a parameter used to obtain the magnitude of the combustion energy in a single cylinder. The combustion energy is larger when the charging efficiency $\eta$ is high than when the charging efficiency $\eta$ is low. This increases the difference in energy in a cylinder in which combustion control is deactivated and a cylinder in which combustion control is continued. As a result, the rotation fluctuation amount is larger when the charging efficiency $\eta$ is high than when the charging efficiency $\eta$ is low.

More specifically, the CPU 102 performs map calculation of the amplitude A with the ROM 104 storing, in advance, map data in which the rotation speed NE and the charging efficiency $\eta$ are input variables and the amplitude A is an output variable.

Subsequently, the CPU 102 determines whether the torque compensation request has been output from the HEVECU 120 (S78). When determining that the torque compensation request has been output from the HEVECU 120 (S78: YES), the CPU 102 calculates a compensation torque $\Delta$Tmg2 (S82). In the present embodiment, the compensation torque $\Delta$Tmg2 is a sinusoidal waveform which has the amplitude A and in which the cycle of torque fluctuation is a single combustion cycle. In S82 of FIG. 6, the crank angle $\eta$ is a variable having a range between 0 and 720° CA and the independent variable of the sinusoidal function is, $\Theta/2+\varphi$. The phase tri is an adaptive element. When determining that the torque compensation request has not been output from the HEVECU 120 (S78: NO), the CPU 102 sends the amplitude A and the upper limit value Tmg2th to the HEVECU 120 (S80). Further, the CPU 102 substitutes 0 into the compensation torque $\Delta$Tmg2 (S84).

When completing the process of S82 or S84, the CPU 102 substitutes, into a second requested torque Tmg2*, the smaller one of the value obtained by adding the compensation torque $\Delta$Tmg2 to the second MG requested torque base value Tmg2b* and the upper limit value Tmg2th of the torque of the second motor generator 54 (S86). Then, the CPU 102 outputs the operation signal MS5 to the inverter 58 in order to control the torque of the second motor generator 54 to the second requested torque Tmg2* (S88). Further, the CPU 102 receives the first requested torque Tmg1* sent from the HEVECU 120 by the process of S62 (S90). Then, the CPU 102 outputs the operation signal MS4 to the inverter 56 in order to control the torque of the first motor generator 52 to the first requested torque Tmg1* (S92).

When completing the process of step S92, the CPU 102 temporarily ends the series of processes shown in FIG. 6.

The operation and advantages of the present embodiment will now be described.

When the deposition amount DPM becomes greater than or equal to the threshold value DPMth, the CPU 72 of the ENGECU 70 calculates the value KiQ of the increase coefficient of the injection amount of a combustion-controlled cylinder and calculates the reduction proportion Rdp in order to execute the regeneration process for the GPF 34 on condition that the predetermined anomaly diagnosis process for the internal combustion engine 10 has not been executed (S10 to S18). Then, the CPU 72 sends, to the HEVECU 120, the reduction proportion Rdp of the output of the internal combustion engine 10 obtained by executing the regeneration process for the GPF 34 and sends, to the HEVECU 120, a request signal of determining whether the fuel cut-off process is permitted (S14, S18).

When receiving the reduction proportion Rdp and the request signal, the CPU 122 of the HEVECU 120 requests the MGECU 100 for the amplitude A and the upper limit value Tmg2th of the compensation torque $\Delta$Tmg2 for the fuel cut-off process of the internal combustion engine 10 (S40 to S42). Then, the CPU 122 determines whether the torque compensation using the compensation torque $\Delta$Tmg2 can be sufficiently performed, by comparing the magnitudes of the upper limit value Tmg2th and the sum of the second MG requested torque base value Tmg2b* and the amplitude A (S44). When determining that the torque compensation can be sufficiently performed (S44: YES), the CPU 122 uses the reduction proportion Rdp to correct the engine requested output Pe* such that the engine requested output Pe* increases relative to the engine requested output base value Peb* (S54). The CPU 122 uses the increased engine requested output Pe* to calculate the engine speed command value NE* (S60). Then, the CPU 122 sends the engine requested torque Te* to the ENGECU 70 (S64).

The CPU 72 of the ENGECU 70 uses the received engine requested torque Te* to set the throttle open degree command value TA* and operate the throttle valve 14 (S24). Thus, as compared with, for example, when the engine requested torque Te* is calculated from the engine requested output base value Peb*, the charging efficiency increases in a combustion-controlled cylinder. This allows the output of the internal combustion engine 10 per combustion cycle to be controlled to the engine requested output base value Peb*.

The CPU 102 of the MGECU 100 controls the torque of the second motor generator 54 to the value obtained by superimposing the compensation torque $\Delta$Tmg2 on the second MG requested torque base value Tmg2b* calculated by the HEVECU 120 (S86 to S88). This allows the torque of the second motor generator 54 to compensate for the insufficiency of the torque of the internal combustion engine 10 when the torque of the internal combustion engine 10 becomes insufficient due to the fuel cut-off process. This restricts the fluctuation in the torque applied to the driven wheels 60. Particularly, in the present embodiment, the compensation torque ΔTmg2 may be positive or negative. This not only allows for the compensation of the torque of the internal combustion engine 10 when the internal combustion engine 10 becomes insufficient due to the fuel cut-off process, but also produces the following advantage. That is, the torque applied to the driven wheels 60 by the internal combustion engine 10 and the second motor generator 54 in a single combustion cycle is prevented from becoming excessive. In other words, in the present embodiment, the output of the internal combustion engine 10 per combustion cycle is controlled to the engine requested output base value Peb* as described above. Accordingly, when the second motor generator 54 compensates for only the insufficient amount of the torque resulting from the fuel cut-off process, the time integral of the output per combustion cycle becomes excessive relative to an intended value. The compensation torque ΔTmg2 of the present embodiment reduces such an excessive torque.

The CPU 102 of the MGECU 100 uses the upper limit value Wout of the output of the battery 59 to calculate the upper limit value Tmg2th of the torque of the second motor generator 54 (S72). When the value obtained by superimposing the compensation torque 66 Tmg2 on the second MG requested torque base value Tmg2b* is much greater than the upper limit value Tmg2th of the torque of the second motor generator 54 (S44: NO), the CPU 122 of the HEVECU 120 determines that the second motor generator 54 is unable to sufficiently compensate for the insufficiency of the torque resulting from the fuel cut-off process, and thus prohibits the regeneration process for the GPF 34 (S48). This prevents situations in which the regeneration process for the GPF 34 results in considerable insufficiency of the torque of the driving system connected to the driven wheels 60.

The above-described present embodiment further provides the following operation and advantage.

(1) On the left side of S44 in FIG. 4, the CPU 122 sets the coefficient Kj to be smaller when the second MG rotation speed Nm2 is high than when the second MG rotation speed Nm2 is low. As the second MG rotation speed Nm2 increases, the rotation speed NE of the crankshaft 26 of the internal combustion engine 10 increases. Thus, the coefficient Kj is set to be smaller when the rotation speed NE is high than when the rotation speed NE is low. Thus, when the rotation speed NE is high, the value obtained by superimposing the compensation torque ΔTmg2 on the second MG requested torque base value Tmg2b* in order to execute the regeneration process for the GPF 34 is permitted to fall below the upper limit value Tmg2th by a larger amount. The inertial energy is larger when the rotation speed NE is high than when the rotation speed NE is low. Thus, the rotation fluctuation of the crankshaft 26 caused by deactivating combustion control in a specified cylinder is smaller when the rotation speed NE is high than when the rotation speed NE is low. Accordingly, the minimum compensation torque required to prevent, for example, vibration of a vehicle caused by deactivating combustion control in a specified cylinder during the regeneration process for the GPF 34 tends to be small when the rotation speed NE is high. This achieves a favorable compromise of executing the regeneration process for the GPF 34 as quickly as possible and preventing, for example, vibration of the vehicle perceived by the user.

(2) The CPU 102 variably sets the amplitude A of the compensation torque Δmg2 using the rotation speed NE and the charging efficiency η. The rotation speed NE is a variable used to obtain the inertial energy amount of the crankshaft 26. Thus, the rotation speed NE is a variable indicating, for example, the rotation fluctuation amount of the crankshaft 26 caused by deactivating combustion control in a specified cylinder. The charging efficiency η is a parameter that positively correlates with the combustion energy of a combustion-controlled cylinder. Thus, the charging efficiency η is a variable indicating the torque fluctuation and the rotation fluctuation of the crankshaft 26 that are caused by deactivating combustion control in a specified cylinder. The CPU 102 calculates the amplitude A using these variables (rotation speed NE and charging efficiency η). Accordingly, as compared with when, for example, the amplitude A is set to a fixed value, the compensation torque ΔTmg2 is set to a value that is more suitable for compensating for the insufficiency of torque.

(3) In reference to the air-fuel ratio of air-fuel mixture in a cylinder where combustion control is continued, the CPU 72 of the ENGECU 70 calculates the reduction proportion Rdp of the output of the internal combustion engine 10 obtained by executing the regeneration process for the GPF 34 (S18). Thus, as compared with when, for example, the reduction proportion Rdp is calculated only from the number of cylinders where combustion control is deactivated, not from air-fuel ratio, the reduction proportion Rdp is calculated more accurately. Accordingly, the engine requested torque Te* calculated by the CPU 122 of the HEVECU 120 using the reduction proportion Rdp (S54) can be set to a value used to highly accurately compensate for an output decrease per preset period of the internal combustion engine 10 caused by deactivating combustion control.

(4) When the change amount per unit of time of the accelerator operation amount ACCP is large, the regeneration process for the GPF 34 is prohibited. Thus, when the torque applied to the driven wheels 60 is required to be increased exponentially, the request for exponentially increasing the torque of the driven wheels 60 is prioritized over the regeneration process for the GPF 34. Accordingly, the request for exponentially increasing the torque of the driven wheels 60 is sufficiently satisfied.

Correspondence

The correspondence between the items in the above-described embodiment and the items described in the above-described SUMMARY is as follows. In the following description, the correspondence is shown for each of the numbers in the examples described in the SUMMARY.

[1] The power generation device corresponds to the internal combustion engine 10, the first motor generator 52, and the second motor generator 54. The deactivation process corresponds to the process of S26. The compensation process corresponds to the process of S88 when the process of S82 is executed. The prohibition process corresponds to the processes of S44 to S48.

[2] The electric motor corresponds to the second motor generator 54. The supply device corresponds to the battery 59. The production process corresponds to the process of S88 when the process of S82 is executed.

[3] The process of S44 corresponds to setting the coefficient Kj to be smaller when the second MG rotation speed Nm2 is high than when the second MG rotation speed Nm2 is low.

[4] The amplitude setting process corresponds to the process of S76.

[5] The energy increasing process corresponds to the throttle operation process M12 when the process of S54 is executed.

[6] The fuel increasing process corresponds to the process that outputs the value KiQ of the increase coefficient using the regeneration process M24. The determination process corresponds to the process of S10. The charging efficiency increasing process corresponds to defining the engine requested torque Te* in correspondence with the engine requested output Pe* set by the process of S54 and setting the throttle open degree command value TA* in correspondence with the defined engine requested torque Te*.

[7] The energy increasing process corresponds to the throttle operation process M12 when the process of S54 is executed. The high torque response process corresponds to the throttle operation process M12 based on the processes of S60 and S64 when an affirmative determination is made in the process of S46.

Modifications

The present embodiment may be modified as follows. The above-described embodiment and the following modifications can be combined as long as the combined modifications remain technically consistent with each other.

Modification Related to Amplitude Setting Process

In FIG. 6, the amplitude A may be set using a parameter different from the rotation speed NE and the charging efficiency η. The variable indicating load is not limited to the charging efficiency η and may be, for example, a value obtained by dividing the engine requested output base value Peb* by the engine speed command value NE*. Additionally, the amplitude A does not necessarily have to be set using the variable indicating the rotation speed NE and the variable indicating the load. For example, the amplitude A may be set using only one of the variable indicating the rotation speed NE and the variable indicating the load. However, the amplitude A does not necessarily have to be variably set.

Modification Related to Production Process

In the process (S82) shown in FIG. 6, the compensation torque ΔTmg2 is a sinusoidal waveform in which the cycle of torque fluctuation is a single combustion cycle. However, such a configuration does not have to be employed. For example, the compensation torque ΔTmg2 may be an amount that is greater than zero only during a period. The period is, for example, the appearance interval of the compression top dead center of which the reference is the compression top dead center of a cylinder where the fuel cut-off process is executed.

Modification Related to Charging Efficiency Increasing Process

In the above-described embodiment, the process of S54 of FIG. 4 uses the reduction proportion Rdp of the output of the internal combustion engine 10 caused by executing the regeneration process for the GPF 34 to correct the engine requested output Pe* such that the output increases, and uses the engine requested output Pe* to calculate the engine requested torque Te*. This corrects the throttle open degree command value TA* such that the value increases, thereby increasing the charging efficiency. However, such a configuration does not have to be employed. For example, when the throttle open degree command value setting process M10 includes a process that calculates a charging efficiency command value, the charging efficiency command value from the engine requested output Pe* may be corrected using the reduction proportion Rdp such that the value increases, instead of correcting the engine requested output Pe* using the reduction proportion Rdp such that the output increases.

The operation amount used to increase the charging efficiency is not limited to the open degree of the throttle valve 14. For example, when the internal combustion engine 10 includes an actuator that varies the valve actuation of the intake valve 16, the operation amount used to increase the charging efficiency may be the opening timing or lift amount of the intake valve 16.

Modification Related to Energy Increasing Process

The process that increases the combustion energy amount in a cylinder that is not subject to the regeneration process for the GPF 34 in order to limit a decrease in the average output per combustion cycle of the internal combustion engine 10 caused by the regeneration process is not limited to the process that increases the charging efficiency. For example, a process may be performed to cause the ignition timing to approach a minimum advance for the best torque (MBT).

Modification Related to Compensation Process

For example, as described in Modification Related to Vehicle below, in the case of a vehicle in which only the internal combustion engine 10 is used as the power generation device for the vehicle, the compensation process may only include the process that increases the charging efficiency.

Modification Related to Prohibition Process

In the process of S44 in FIG. 4, the coefficient Kj is variably set in correspondence with the second MG rotation speed Nm2. Instead, the coefficient Kj may be variably set in correspondence with, for example, the rotation speed NE.

In the process of S44 in FIG. 4, when the value obtained by multiplying the coefficient Kj by the sum of the maximum value of the compensation torque ΔTmg2 (i.e., amplitude A) and the second MG requested torque base value Tmg2b* is greater than the upper limit value Tmg2th (S44: NO), the fuel cut-off process is prohibited (S48). However, such a configuration does not have to be employed. For example. the coefficient Kj does not have to be multiplied in S44.

The process that determines whether compensation can be performed using the compensation torque ΔTmg2 is not limited to the process of S44 or the modification described in the previous paragraph. For example, a process may be performed to determine whether the power necessary to set the torque of the second motor generator 54 to Tmg2b*+ΔTrq is less than or equal to Wout−Pg*.

Modification Related to Regeneration Process

In the above-described embodiment, the number of cylinders in which fuel cut-off is performed is varied. Instead, for example, the number of cylinders may be limited such that fuel cut-off is normally performed for a single cylinder.

In the above-described embodiment, the air-fuel ratio of air-fuel mixture is varied in a cylinder in which the fuel cut-off process is not executed. Instead, the air-fuel ratio may be fixed at a preset value that is richer than the stoichiometric air-fuel ratio. The process that makes the air-fuel ratio richer than the stoichiometric air-fuel ratio does not have to be performed. For example, the air-fuel ratio may be the stoichiometric air-fuel ratio if an addition valve that adds fuel to the exhaust passage 30 is provided and the addition valve is used for the regeneration process.

The process that estimates the deposition amount DPM is not limited to the one illustrated in FIG. 2. Instead, for example, the deposition amount DPM may be estimated using the intake air amount Ga and the pressure difference between the upstream side and the downstream side of the GPF 34. More specifically, the deposition amount DPM is estimated to be a larger value when the pressure difference is large than when the pressure difference is small. Even when the pressure difference is the same, the deposition amount DPM simply needs to be estimated to be a larger value when the intake air amount Ga is small than when the intake air amount Ga is large. If the pressure in the downstream side of the GPF 34 is regarded as a fixed value, the pressure Pex detected by the exhaust pressure sensor 88 may be used instead of the pressure difference.

Modification Related to Deactivation Process

The deactivation process is not limited to the regeneration process for the GPF 34. For example, the deactivation process may be a process that deactivates the supply of fuel in a specified cylinder in order to adjust the output of the internal combustion engine 10. Instead, when an anomaly occurs in a specified cylinder, a process may be performed to deactivate combustion control in the cylinder having the anomaly. Alternatively, when the oxygen absorption amount of the three-way catalyst 32 is less than or equal to a given value, a process may be performed to deactivate combustion control only in a specified cylinder and execute control that sets the air-fuel ratio of air-fuel mixture in the remaining cylinders to the stoichiometric air-fuel ratio.

Modification Related to Supply Device

In the above-described embodiment, the supply device that supplies power to the second motor generator 54 is the battery 59, but is not limited to the battery 59. For example, the supply device may be a capacitor. Alternatively, the supply device may be a parallel connector of a capacitor and a fuel cell.

Modification Related to Aftertreatment Device

The GPF 34 is not limited to the filter supported by the three-way catalyst and may be only the filter. Further, the GPF 34 does not have to be located on the downstream side of the three-way catalyst 32 in the exhaust passage 30. Furthermore, the aftertreatment device does not necessarily have to include the GPF 34. For example, even when the aftertreatment device includes only the three-way catalyst 32, the processes illustrated in the above-described embodiment and the modifications are effectively executed during the temperature-increasing process.

Modification Related to Controller

The process of S44 may be executed by the MGECU 100, and the HEVECU 120 may be notified of the determination result. The process that calculates the amplitude A may be executed by the HEVECU 120, and the MGECU 100 may be notified of the calculated amplitude A.

The controller is not limited to a device that includes the ENGECU 70, the MGECU 100, and the HEVECU 120 each having a different housing. For example, the controller may include a single drive system ECU that includes all of the functions of these ECUs.

The controller is not limited to a device that includes the CPU 72, 102, 122 and the ROM 74, 104, 124 and executes software processing. For example, at least part of the processes executed by the software in the above-illustrated embodiment may be executed by hardware circuits dedicated to executing these processes (such as ASIC). That is, the controller may be modified as long as it has any one of the following configurations (a) to (c): (a) a configuration including a processor that executes all of the above-described processes according to programs and a program storage device such as a ROM (including a non-transitory computer readable medium) that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software processing circuits each including a processor (processing circuit) and a program storage device (memory circuit) and a plurality of dedicated hardware circuits may be provided. That is, the above-described processes may be executed in any manner as long as the processes are executed by an execution device that includes at least one of one or more software processing circuits and one or more dedicated hardware circuits.

Modification Related to Vehicle

The vehicle is not limited to a series-parallel hybrid vehicle and may be, for example, a parallel hybrid vehicle or a series-parallel hybrid vehicle. The hybrid vehicle may be replaced with, for example, a vehicle in which only the internal combustion engine 10 is used as a power generation device for the vehicle.

Other Modifications

The above-described predetermined diagnosis process that determines whether the execution of the regeneration process is permitted is not limited to the ones described in the embodiment.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the controller being employed in a vehicle including a power generation device that generates driving torque applied to a driven wheel, wherein
    the power generation device includes the internal combustion engine having cylinders, and
    the controller is configured to execute:
        a deactivation process that deactivates combustion control in a specified one of the cylinders;
        a compensation process that operates the power generation device so as to compensate for insufficiency of the driving torque of the vehicle, the insufficiency being caused by the deactivation process; and
        a prohibition process that prohibits the deactivation process when it is determined that compensation by a predetermined amount or larger by the compensation process cannot be performed.

2. The controller according to claim 1, wherein
    the power generation device includes an electric motor,
    the vehicle includes a supply device that supplies power to the electric motor,
    the compensation process includes a production process that produces a compensation torque such that the electric motor compensates for insufficiency of torque in a predetermined period after a compression top dead center of the specified one of the cylinders, and the prohibition process includes a process that prohibits execution of the deactivation process when an output of the supply device is insufficient relative to power necessary for the production process by a predetermined amount or larger.

3. The controller according to claim 2, wherein
the prohibition process includes a process that sets a lower limit value of an insufficient amount of the output of the supply device to be greater when a rotation speed of a crankshaft of the internal combustion engine is high than when the rotation speed is low, and
the insufficient amount is an amount in which the output of the supply device to prohibit the execution of the deactivation process is insufficient relative to the power necessary for the production process.

4. The controller according to claim 3, wherein
the compensation torque changes cyclically, a cycle of the change in the torque being a single combustion cycle,
the production process includes an amplitude setting process that variably sets a difference between a maximum value and a minimum value of the compensation torque that changes cyclically, and
the amplitude setting process variably sets the difference using at least one of the rotation speed of the crankshaft or load on the crankshaft.

5. The controller according to claim 2, wherein
the compensation process includes an energy increasing process, and
the energy increasing process increases a combustion energy amount in a cylinder that differs from the specified one of the cylinders so as to limit a decrease in an output of the internal combustion engine, the decrease being caused by the deactivation process.

6. The controller according to claim 5, wherein
the internal combustion engine includes an exhaust passage and an aftertreatment device for exhaust gas arranged in the exhaust passage,
the controller is configured to execute:
    a regeneration process for the aftertreatment device; and
    a determination process that determines whether an execution request of the regeneration process has been issued,
the regeneration process includes a fuel increasing process and the deactivation process,
the fuel increasing process increases an amount of injection performed by a fuel injection valve of the internal combustion engine such that an air-fuel ratio of air-fuel mixture in a cylinder that differs from the specified one of the cylinders becomes richer than a reference air-fuel ratio,
the energy increasing process includes a charging efficiency increasing process, and
the charging efficiency increasing process controls a charging efficiency of the cylinder that differs from the specified one of the cylinders such that the charging efficiency becomes larger than when the deactivation process is not executed and controls the charging efficiency in correspondence with an amount of fuel increased by the fuel increasing process such that the charging efficiency becomes larger than when the deactivation process is not executed.

7. The controller according to claim 1, wherein
the compensation process includes an energy increasing process,
the energy increasing process increases a combustion energy amount in a cylinder that differs from the specified one of the cylinders so as to limit a decrease in an output of the internal combustion engine, the decrease being caused by the deactivation process,
the controller is further configured to execute a high torque response process,
the high torque response process adjusts an operating point of the internal combustion engine such that an identical output is provided at a lower rotation speed when an increased speed of a requested torque for the power generation device is greater than or equal to a predetermined speed than when the increased speed of the requested torque is less than the predetermined speed, and
the prohibition process includes a process that prohibits the deactivation process when it is determined that the compensation by the predetermined amount or larger by the compensation process cannot be performed in a case in which the high torque response process is executed.

8. A control method for an internal combustion engine, the control method being employed in a vehicle including a power generation device that generates driving torque applied to a driven wheel, wherein
the power generation device includes the internal combustion engine having cylinders, and
the control method comprises:
    deactivating combustion control in a specified one of the cylinders;
    operating the power generation device so as to compensate for insufficiency of the driving torque of the vehicle, the insufficiency being caused by the deactivating of the combustion control in the specified one of the cylinders; and
    prohibiting the deactivating of the combustion control in the specified one of the cylinders when it is determined that compensation for the insufficiency of the driving torque by a predetermined amount or larger cannot be performed even by operating the power generation device.

9. A non-transitory computer-readable medium that stores a program for causing a processor to execute a control process for an internal combustion engine, the control process being employed in a vehicle including a power generation device that generates driving torque applied to a driven wheel, wherein
the power generation device includes the internal combustion engine having cylinders, and
the control process includes:
    deactivating combustion control in a specified one of the cylinders;
    operating the power generation device so as to compensate for insufficiency of the driving torque of the vehicle, the insufficiency being caused by the deactivating of the combustion control in the specified one of the cylinders; and
    prohibiting the deactivating of the combustion control in the specified one of the cylinders when it is determined that compensation for the insufficiency of the driving torque by a predetermined amount or larger cannot be performed even by operating the power generation device.

* * * * *